United States Patent [19]

Lin

[11] Patent Number: 5,733,633
[45] Date of Patent: Mar. 31, 1998

[54] FIRE-RESISTING SLABS FABRICATION METHOD

[76] Inventor: Fong Shih Lin, P. O. Box 82-144, Taipei, Taiwan

[21] Appl. No.: 714,322

[22] Filed: Sep. 18, 1996

[51] Int. Cl.$^6$ .................................................. B32B 9/00
[52] U.S. Cl. .................... 428/192; 428/68; 428/74; 428/113; 428/114; 428/252; 428/319.1; 428/326; 428/393; 428/426; 428/537.1; 428/701; 428/702; 264/46.4; 264/256; 106/18.11; 52/404; 52/809
[58] Field of Search .................. 428/326, 114, 428/113, 319.1, 426, 329, 74, 192, 68, 393, 252, 537.1, 701, 702, 148; 52/404, 809; 264/256, 46.4; 106/18.11

[56] References Cited

U.S. PATENT DOCUMENTS

| | | | |
|---|---|---|---|
| 3,951,885 | 4/1976 | Thompson | 106/107 |
| 4,150,185 | 4/1979 | Prymelski | 428/113 |
| 4,364,987 | 12/1982 | Goodwin | 428/192 |
| 4,366,204 | 12/1982 | Briggs | 428/304.4 |

*Primary Examiner*—Patrick Ryan
*Assistant Examiner*—Abraham Bahta
*Attorney, Agent, or Firm*—A & J

[57] ABSTRACT

A fire resisting slab fabrication method including the steps of i) preparing a first compound by mixing by weight 25%–30% magnesium oxide with 20%–25% magnesium chloride and 10%–15% water at room temperature; ii) preparing a second compound by mixing by weight 15%–20% foamed plastic with 15%–20% wooden chips and 5%–10% quartz sand at room temperature; iii) mixing the first compound with the second compound at room temperature, so as to obtain a mixture; and, iv) processing the mixture thus obtained into a flat core layer by means of a press roll mechanism, and simultaneously covering two layers of meshed glass fiber cloths and two layers of meshed non-woven cloths on two opposite sides of the core layer.

1 Claim, 2 Drawing Sheets

FIRE-RESISTING SLABS FABRICATION METHOD

BACKGROUND OF THE INVENTION

The present invention relates to a method of fabricating fire-resisting slabs, and relates more particularly to such a fire-resisting slab fabrication method which covers two meshed glass fiber cloths and two meshed non-woven cloths on both sides of a core layer by means of a press roll mechanism.

In order to protect against fire, fire-fighting specialists commonly recommend people to use fire-resisting construction materials for constructing partition walls, ceilings, etc. However, regular fire-resisting construction materials are relatively expensive. There are known various fire-resisting boards and slabs developed-for construction use. These fire-resisting boards and slabs include gypsum boards, fiber-reinforced cement slabs, calcium silicate slabs. However, these fire-resisting boards and slabs still have drawbacks. Regular gypsum boards are commonly heavy (specific gravity is as high as 0.65), and their power of impact resistance is weak. Furthermore, because gypsum boards will absorb moisture from air, they are not suitable for use in high humidity area. The main drawback of fiber reinforced cement slabs is their high contraction percentage, therefore it is not easy to process fire reinforced cement slabs into desired patterns. Regular calcium silicate slabs are very expensive. When to cut a calcium silicate slab, a diamond cutter shall be used.

SUMMARY OF THE INVENTION

A fire-resisting slab is made by bonding two layers of meshed glass fiber cloths and two layers of meshed non-woven cloths on two opposite sides of a core layer through a press roll mechanism. The core layer is obtained by mixing two compounds. The first compound is obtained by mixing by weight 25%–30% magnesium oxide with 20%–25% magnesium chloride and 10%–15% water at room temperature. The second compound is obtained by mixing by weight 15%–20% foamed plastic with 15%–20% wooden chips and 5%–10% quartz sand at room temperature.

DETAILED DESCRIPTION OF THE PREFERRED EMBODIMENT

Figure 3:
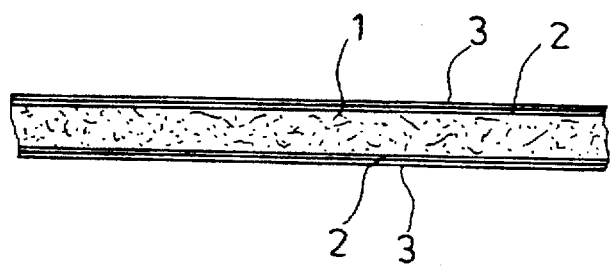

Referring to FIG. 3, a fire-resisting slab is generally comprised of a core layer 1, two meshed glass fiber cloths 2 covered on two opposite sides of the cover layer 1, and two meshed non-woven cloths 3 covered on the meshed glass fiber cloths 12 on the outside.

Figure 1:
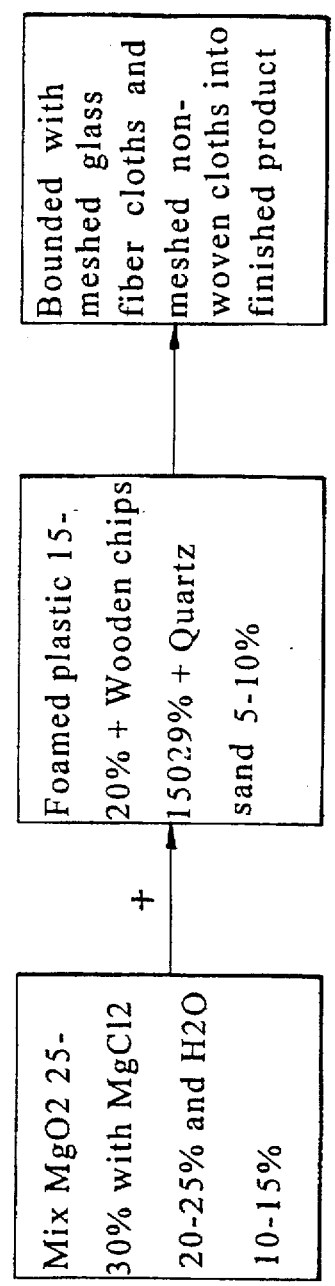
FIG. 1 is a fire-resisting slab fabrication flow chart according to the present invention.

Referring to FIGS. 1 and 3, the core layer 1 is made from a mixture obtained from two compounds, namely, the first compound and the second compound. The first compound is comprised of by weight 25%–30% magnesium oxide, 20%–25% magnesium chloride, and 10%–15% water, and the second compound. The components of the first compound are mixed at room temperature. The second compound is comprised of by weight 15%–20% foamed plastic, 15%–20% wooden chips, and 5%–10% quartz sand. The components of the second compound are mixed at room temperature.

Figure 2:
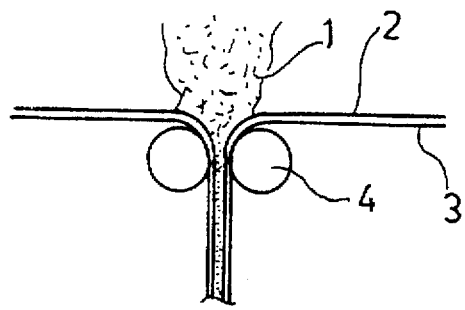
FIG. 2 is a schematic drawing showing materials squeezed between press rolls according to the present invention; and, FIG. 3 is a cross-sectional view of a fire-resisting slab made according to the present invention.

Referring to FIG. 2, the two layers of meshed non-woven cloths 3 and the two layers of meshed glass fiber cloths 2 are respectively overlaid one-to-one, and then bilaterally delivered through press rolls 4, and at the same time the mixture for the core layer 1 is fed into the press rolls 4 between the meshed glass fiber cloths 2. Through the processing of the press rolls 4, the mixture for the core layer 1, the meshed glass fiber cloths 2, and the meshed non-woven cloths 3 are squeezed, and bounded together. A finished fire-resisting slab, as shown in FIG. 3, is lightweight, fire-resistant, and sound insulative.

What the invention claimed is:

1. A fire resisting slab fabrication method comprising the steps of:

preparing a first compound by mixing by weight 25%–30 magnesium oxide with 20%–25% magnesium chloride and 10%–15% water at room temperature;

preparing a second compound by mixing by weight 15%–20% foamed plastic with 15%–20% wooden chips and 5%–10% quartz sand at room temperature;

mixing said first compound with said second compound at room temperature, so as to obtain a mixture; and processing the mixture thus obtained into a flat core layer by means of a press roll mechanism, and simultaneously covering two layers of meshed glass fiber cloths and two layers of meshed non-woven cloths on two opposite sides of the core layer, said meshed glass fiber cloths being respectively bounded between two opposite sides of said core layer and said meshed non-woven fabric.

* * * * *